(12) United States Patent
Arkusz

(10) Patent No.: US 9,999,269 B2
(45) Date of Patent: Jun. 19, 2018

(54) METHODS AND APPARATUS FOR A HEAD COVERING DEVICE WITH INCREASED AIR CIRCULATION

(71) Applicant: Tomasz Arkusz, Chandler, AZ (US)

(72) Inventor: Tomasz Arkusz, Chandler, AZ (US)

(\*) Notice: Subject to any disclaimer, the term of this patent is extended or adjusted under 35 U.S.C. 154(b) by 405 days.

(21) Appl. No.: 14/623,677

(22) Filed: Feb. 17, 2015

(65) Prior Publication Data
US 2015/0237942 A1    Aug. 27, 2015

Related U.S. Application Data

(60) Provisional application No. 61/943,366, filed on Feb. 22, 2014.

(51) Int. Cl.
| | |
|---|---|
| *A42C 5/04* | (2006.01) |
| *A42B 1/00* | (2006.01) |
| *A42B 3/28* | (2006.01) |
| *B29C 45/40* | (2006.01) |
| *B33Y 10/00* | (2015.01) |
| *B33Y 80/00* | (2015.01) |
| *B29L 31/48* | (2006.01) |
| *B29L 31/60* | (2006.01) |

(52) U.S. Cl.
CPC ............... *A42B 1/008* (2013.01); *A42B 3/28* (2013.01); *A42C 5/04* (2013.01); *B29C 45/40* (2013.01); *B29L 2031/4814* (2013.01); *B29L 2031/608* (2013.01); *B33Y 10/00* (2014.12); *B33Y 80/00* (2014.12)

(58) Field of Classification Search
CPC .. A41B 1/008; A41B 1/18; A42B 3/24; A42B 3/28; A42C 5/04; B29L 2031/4814; B29L 2031/608; Y42B 1/208; B29C 45/40; B33Y 10/00; B33Y 80/00
USPC .................. 2/195.1, 209.7, 209.3, 171.3
See application file for complete search history.

(56) References Cited

U.S. PATENT DOCUMENTS

| | | |
|---|---|---|
| 4,122 A | 7/1845 | Cherry |
| 53,406 A | 3/1866 | Burnett |
| 233,384 A | 10/1880 | Welz |
| 350,651 A | 10/1886 | Basch |
| 402,182 A | 4/1889 | O'Connor |
| 504,350 A | 9/1893 | Harkins |

(Continued)

FOREIGN PATENT DOCUMENTS

JP    2010-222761 A    10/2010

*Primary Examiner* — Sally Haden
*Assistant Examiner* — Jillian K Pierorazio
(74) *Attorney, Agent, or Firm* — The Noblitt Group, PLLC

(57) ABSTRACT

Methods and apparatus for a head covering may improve air circulation through any suitable head covering. Methods and apparatus for a head covering may comprise a base configured to fit around a wearer's head, a sidewall comprising a plurality of open cells configured to prevent light rays at or above a predetermined angle relative to the passageway of each cell from passing unobstructed through the cell, and a crown configured to close of the interior surface of the sidewall. The minimum depth of each cell may be determined based on the height of the cell, the angle at or above which the light rays are to obstructed, and the angle of the exterior cell opening. The cells may be arranged in the sidewall such that the lower surface of the passageway of each cell is substantially at the same angle with respect to a horizontal plane.

16 Claims, 9 Drawing Sheets

(56) References Cited

U.S. PATENT DOCUMENTS

Figure 1A:
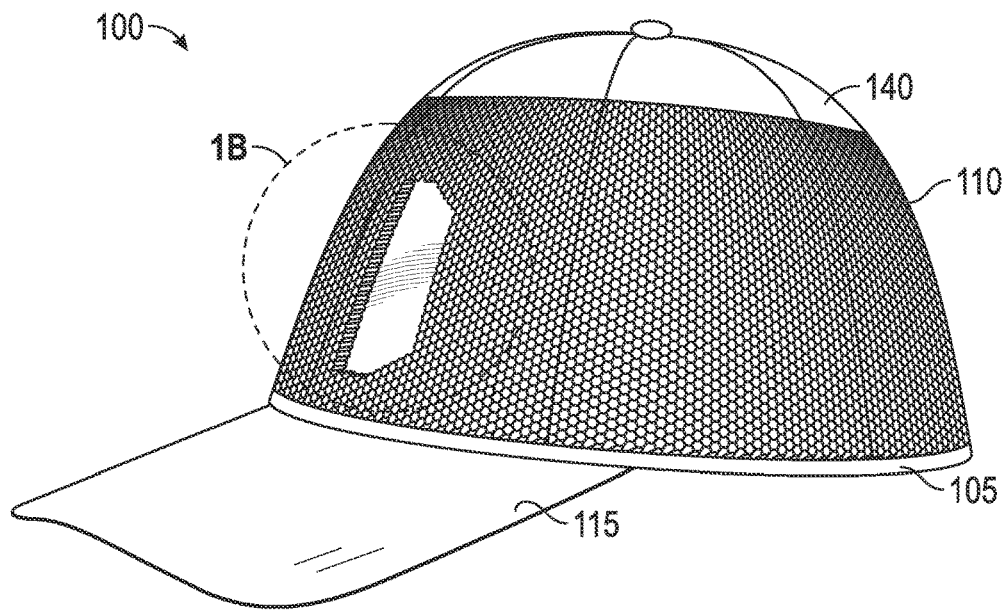

| | | | |
|---|---|---|---|
| 707,486 A | 8/1902 | Wolbrecht | |
| 889,981 A | 6/1908 | Snyder | |
| 1,036,004 A | 8/1912 | Revell | |
| 1,062,668 A * | 5/1913 | Swanson | A42C 5/04 |
| | | | 2/184.5 |
| 1,194,935 A | 8/1916 | Bell | |
| 1,338,283 A | 4/1920 | Bradley | |
| 1,996,254 A * | 4/1935 | Parlow | A42B 1/208 |
| | | | 2/184.5 |
| 3,169,251 A * | 2/1965 | Humes, Jr. | A42B 1/201 |
| | | | 135/33.7 |
| 3,447,163 A * | 6/1969 | Tojeiro | A42B 3/065 |
| | | | 2/412 |
| 3,811,130 A * | 5/1974 | Townsend, Jr. | A42C 5/04 |
| | | | 2/175.1 |
| 3,925,821 A | 12/1975 | Lewicki | |
| 3,927,421 A * | 12/1975 | Simon | A42B 3/0493 |
| | | | 2/12 |
| RE29,452 E | 10/1977 | Townsend | |
| 4,114,201 A * | 9/1978 | Garrison | A42B 1/062 |
| | | | 2/209.7 |
| 4,292,689 A * | 10/1981 | Townsend, Jr. | A61F 9/045 |
| | | | 2/12 |
| 4,434,514 A | 3/1984 | Sundahl et al. | |
| 4,476,589 A * | 10/1984 | Burgin | A42C 5/04 |
| | | | 2/184.5 |
| 4,550,445 A | 11/1985 | Fender | |
| 4,704,746 A | 11/1987 | Nava | |
| 4,945,575 A * | 8/1990 | Townsend | A61F 9/045 |
| | | | 2/12 |
| 4,991,237 A * | 2/1991 | Dwyer | A42B 1/004 |
| | | | 2/209.7 |
| 5,495,622 A | 3/1996 | Kaufman | |
| D407,889 S * | 4/1999 | Lee | D2/882 |
| 6,376,067 B1 | 4/2002 | Heberger et al. | |
| 6,526,595 B2 | 3/2003 | Held | |
| 6,598,237 B2 | 7/2003 | Held | |
| 6,691,322 B2 | 2/2004 | Held | |
| 6,735,779 B1 * | 5/2004 | Shrem | A61F 9/045 |
| | | | 2/10 |
| 7,398,560 B1 | 7/2008 | Swensen | |
| 8,082,599 B2 * | 12/2011 | Sajic | A41D 31/005 |
| | | | 2/411 |
| 8,516,617 B1 | 8/2013 | Kazmierczak | |
| 2016/0291447 A1 * | 10/2016 | Branham | G03B 15/06 |

\* cited by examiner

METHODS AND APPARATUS FOR A HEAD COVERING DEVICE WITH INCREASED AIR CIRCULATION

CROSS-REFERENCES TO RELATED APPLICATIONS

This application claims the benefit of U.S. Provisional Patent Application No. 61/943,366, filed Feb. 22, 2014, titled HONEYCOMB HAT, and incorporates its disclosure by reference.

BACKGROUND OF THE INVENTION

Many head coverings are designed to protect the wearer's face and head from the sun, providing relief from the sun and limiting the short term and long term health problems associated with overexposure to direct sunlight. Contemporary head coverings may allow some passive air circulation within the head covering to increase the comfort of the wearer. However, current head covering designs fail to achieve a sufficient level of air circulation, and under direct sunlight the temperature inside the head covering may rise to uncomfortable levels. This may result in the wearer regularly taking the head covering off and exposing the wearer's head and face to harmful sunlight.

For example, a common method for allowing air circulation is to place small holes in the head covering, often in the crown. The holes must be small and there must be relatively few of them to prevent unwanted sunlight from reaching the wearer's head. This may result in restricted air circulation. Another method for allowing air circulation is to incorporate a thin flexible mesh into the design of the hat. The mesh, however, may also allow a dangerous amount of direct ultraviolet radiation from the sun to reach the wearer's head. Other attempts to increase air circulation may include mechanical devices which force air into the dome, but these methods substantially increase manufacturing costs and have not found a wider market acceptance. These and other contemporary head covering designs therefore fail to achieve a sufficient level of air circulation while providing adequate protection from the sun.

SUMMARY OF THE INVENTION

Methods and apparatus for a head covering may improve air circulation through any suitable head covering while protecting a wearer's head from harmful sunlight. In an exemplary embodiment, a head covering may comprise a base configured to fit around the wearer's head, a sidewall comprising a plurality of open cells configured to prevent light rays at or above a predetermined angle relative to the passageway of each cell from passing unobstructed through the cell, and a crown configured to close off the interior surface of the sidewall and cover the user's head. A minimum depth of each cell may be determined based on a height of the cell, an angle relative to the cell at or above which the light rays are to be obstructed, and an angle of the exterior cell opening. The cells may be arranged in the sidewall such that a lower surface of the passageway of each cell is substantially at the same angle with respect to a horizontal plane, and the interior and exterior cell openings may be tangent to the horizontal contour of the head covering. In certain exemplary embodiments, methods and apparatus for a head covering may be applied to a head-protecting head covering, such as a hard hat, helmet, or the like.

BRIEF DESCRIPTION OF THE DRAWING FIGURES

A more complete understanding of the present technology may be derived by referring to the detailed description and claims when considered in connection with the following illustrative figures. In the following figures, like reference numbers refer to similar elements and steps throughout the figures.

Figure 1B:
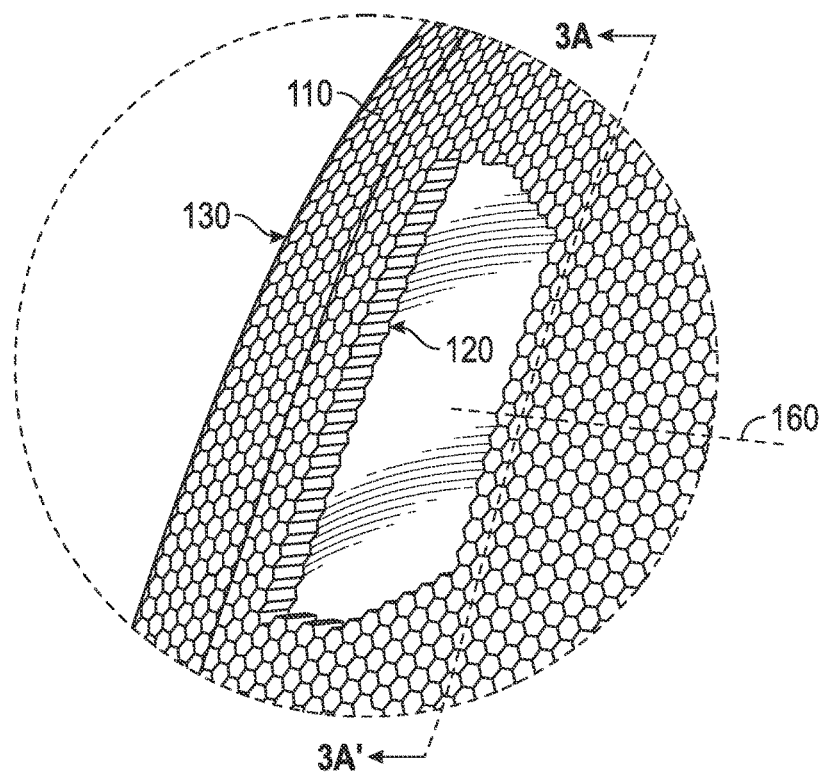
Figure 2:
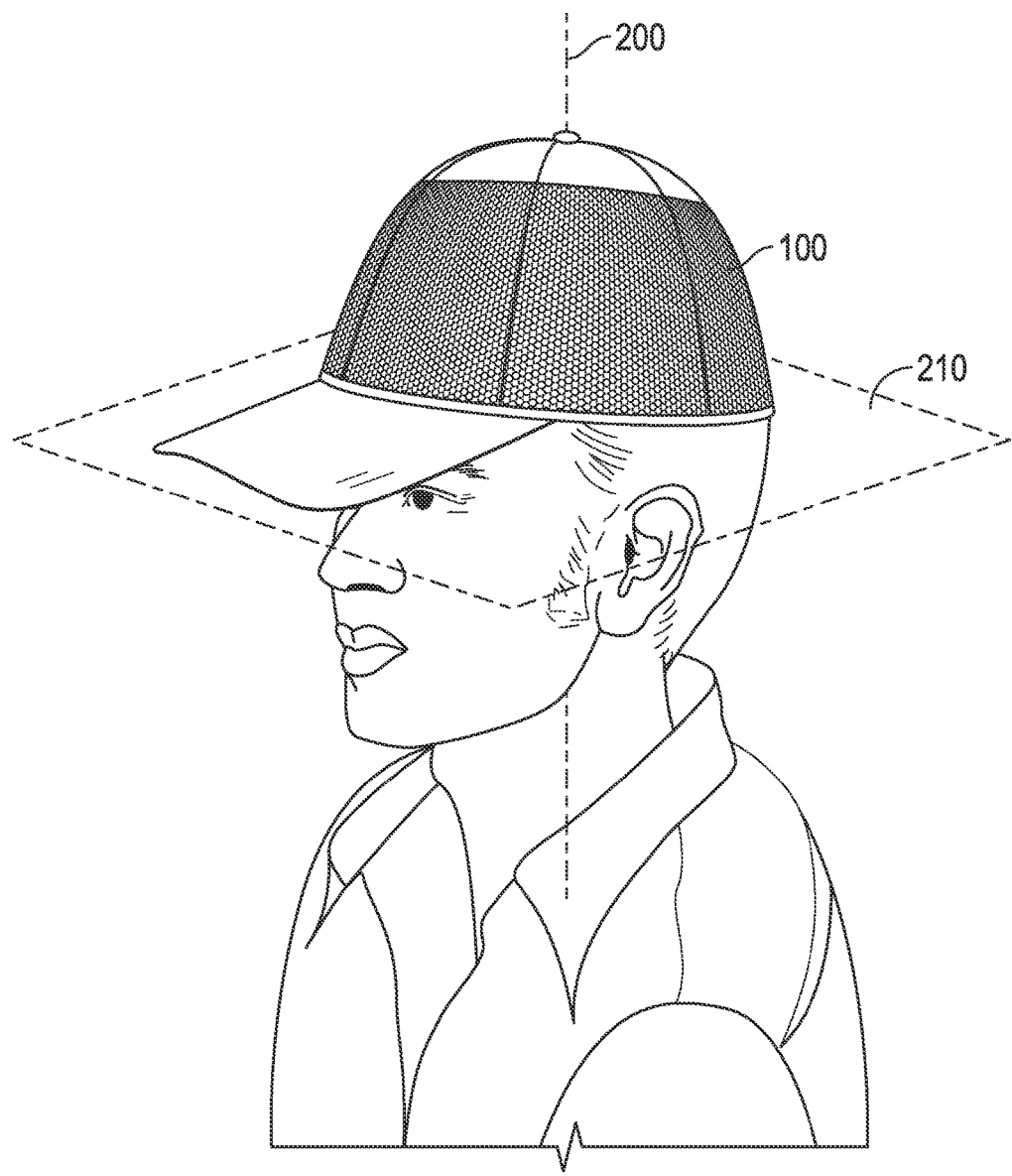
Figure 3A:
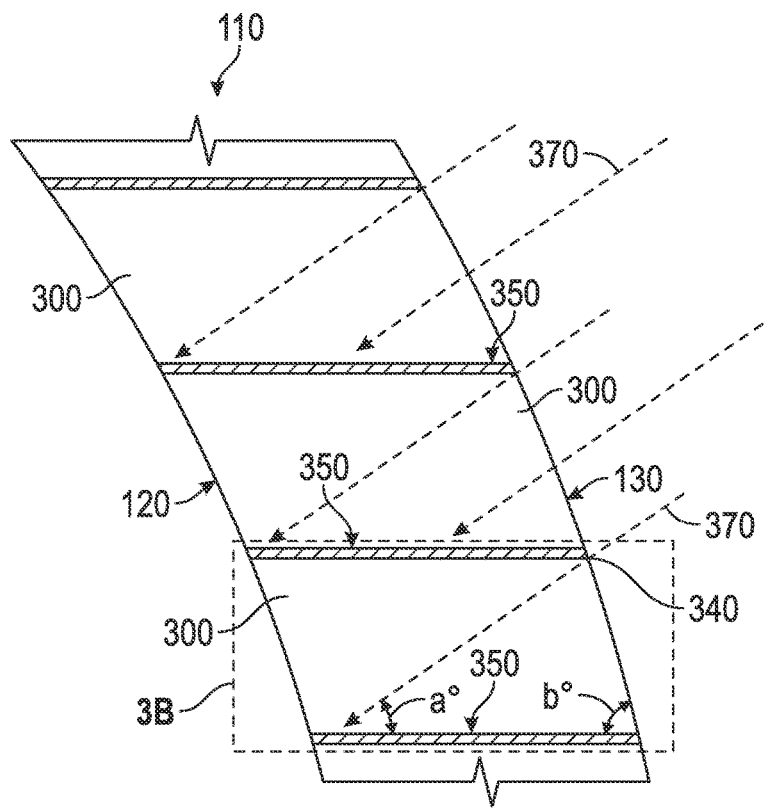
Figure 3B:
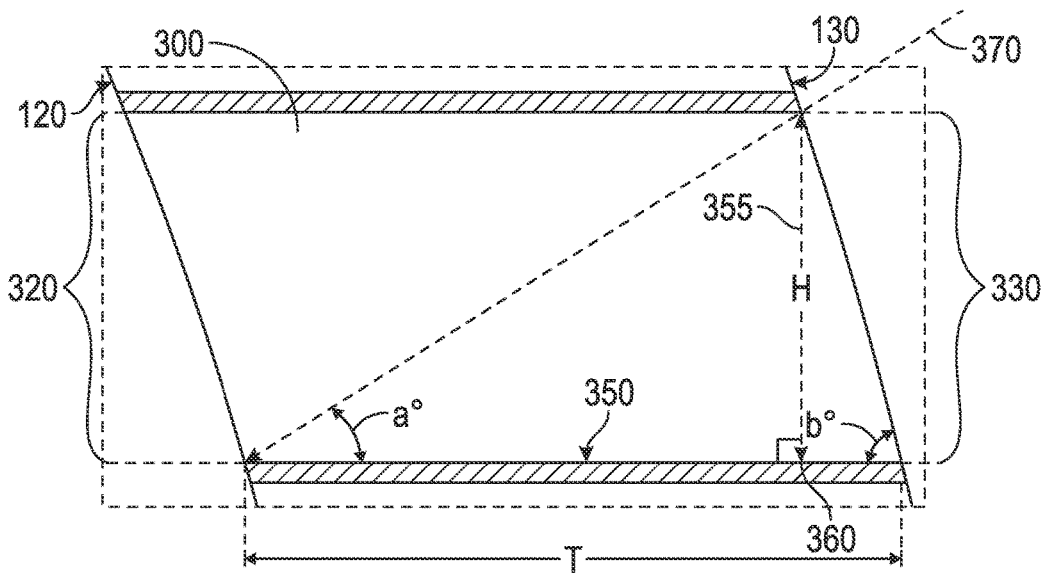
Figure 4A:
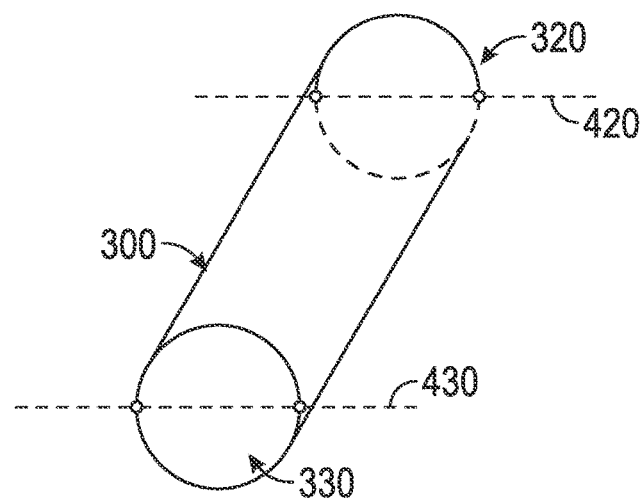
Figure 4B:
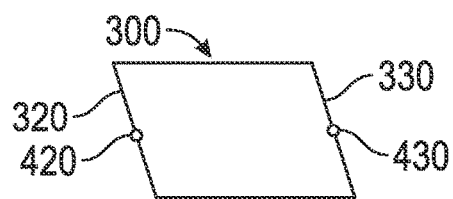
Figure 4C:
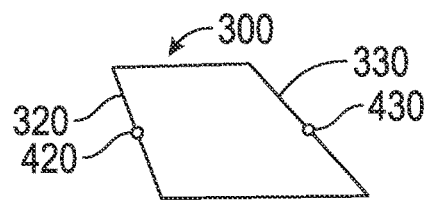
Figure 4D:
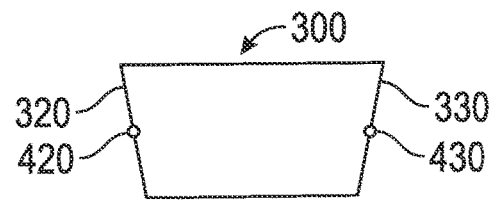
Figure 5A:
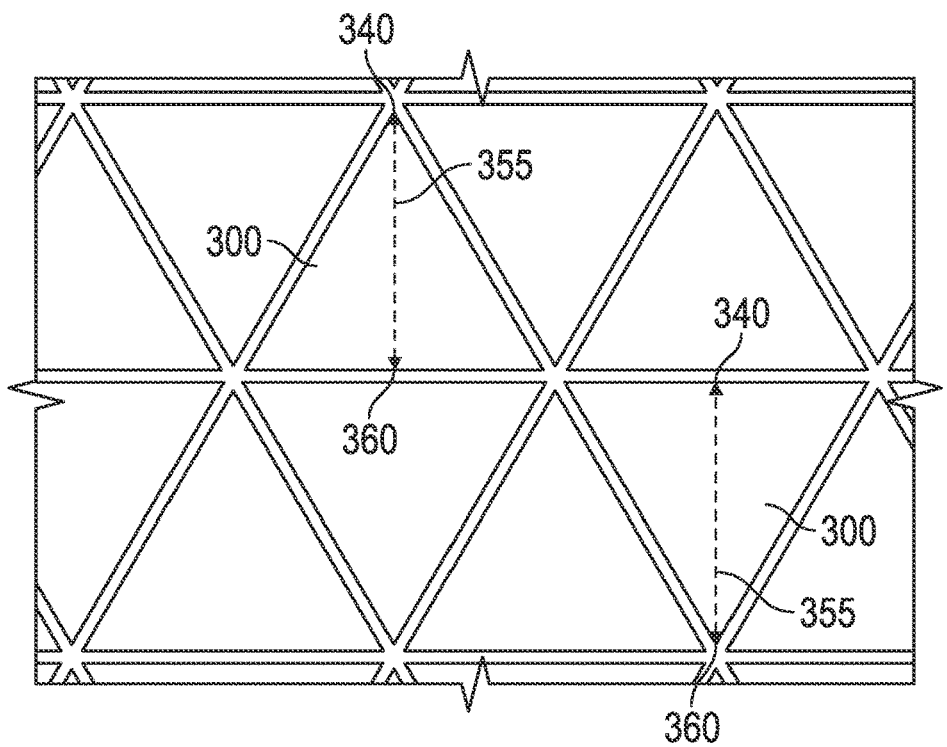
Figure 5B:
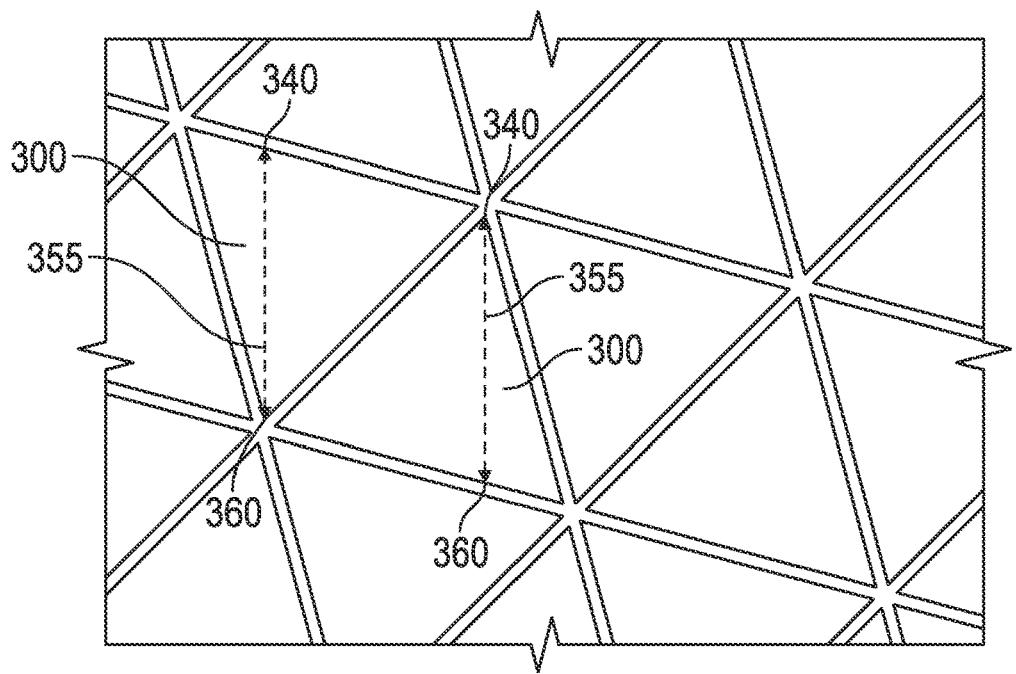
Figure 6A:
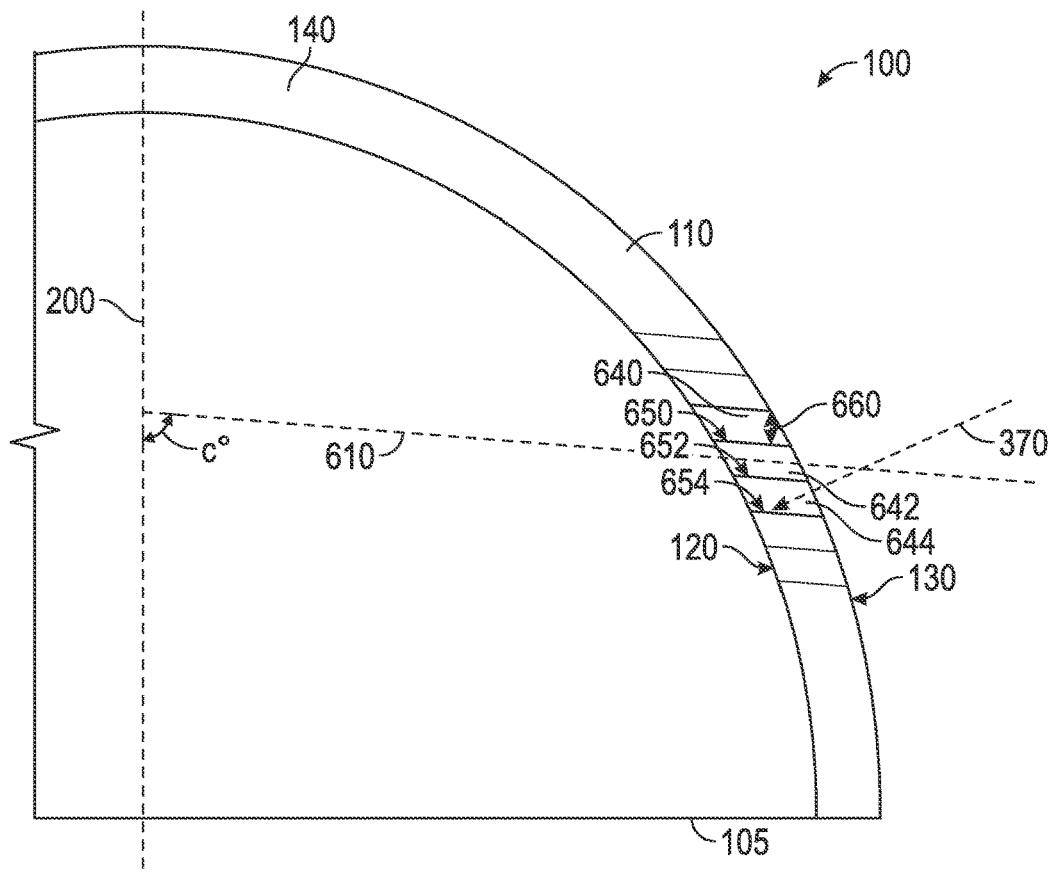
Figure 6B:
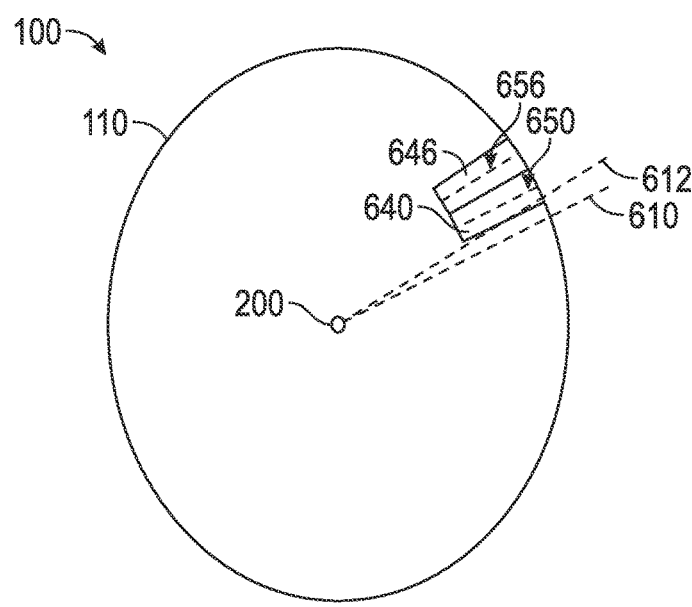
Figure 7:
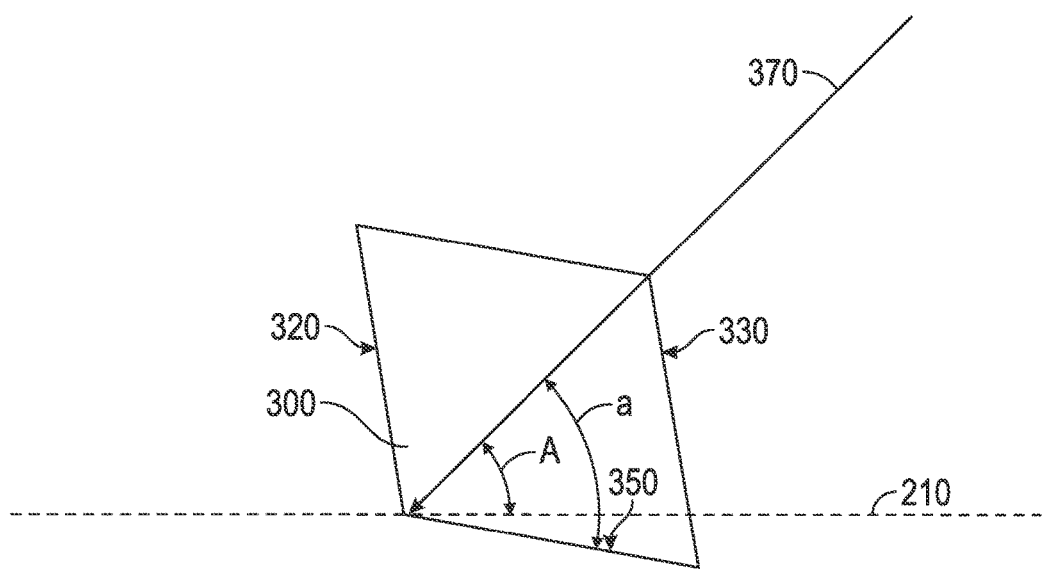
Figure 8A:
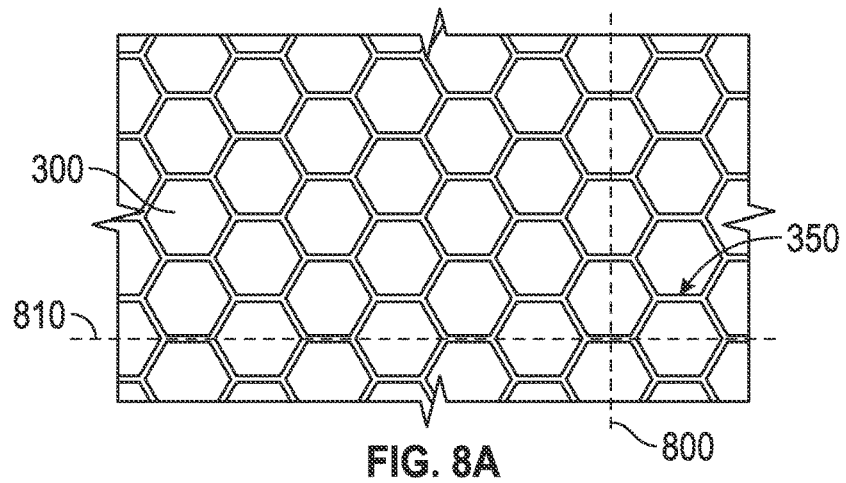
Figure 8B:
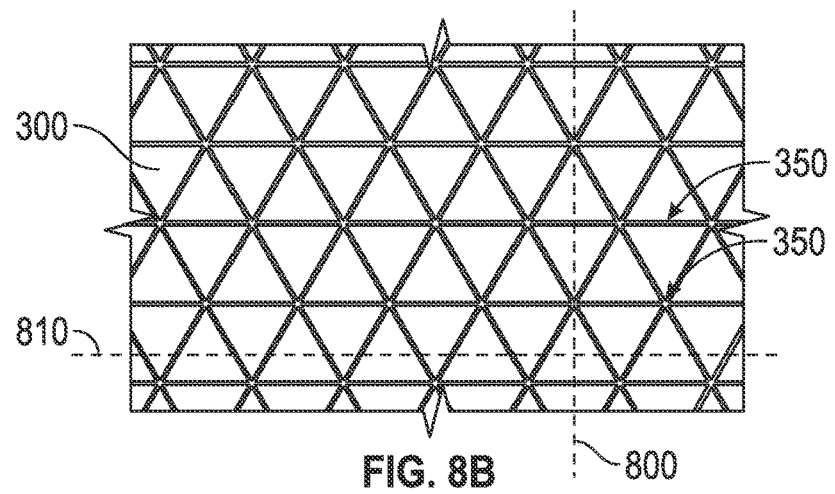
Figure 8C:
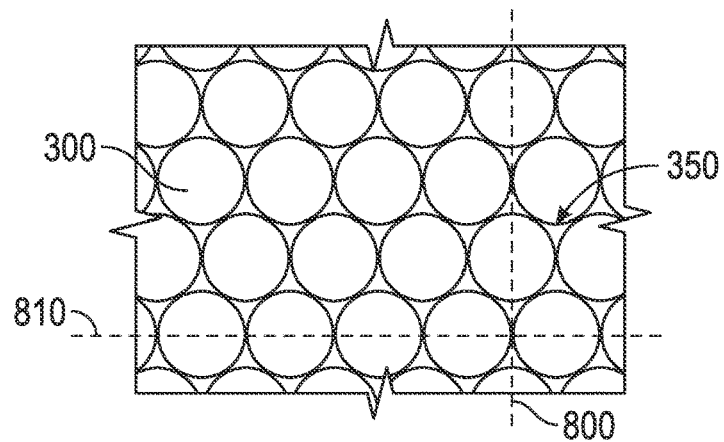
Figure 9:
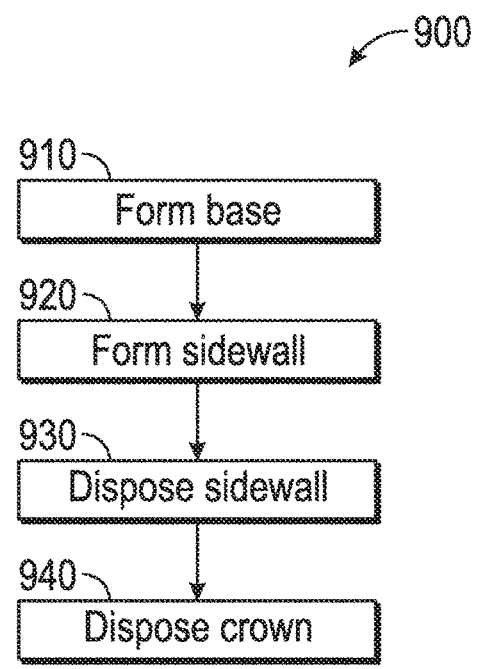

FIG. 1A representatively illustrates a head covering with a partial cut-away section in accordance with an exemplary embodiment of the present technology;

FIG. 1B representatively illustrates a close up view of the partial cut-away section of the head covering shown in 1A in accordance with an exemplary embodiment of the present technology;

FIG. 2 representatively illustrates a head covering worn on a human head in accordance with an exemplary embodiment of the present technology;

FIG. 3A representatively illustrates a first cross-sectional view of a sidewall of the head covering in accordance with an exemplary embodiment of the present technology;

FIG. 3B representatively illustrates a cross-sectional view of a first cell in accordance with an exemplary embodiment of the present technology;

FIG. 4A representatively illustrates a perspective view of a second cell in accordance with an exemplary embodiment of the present technology;

FIGS. 4B-4D representatively illustrate a plurality of cross-sectional views of the second cell in accordance with exemplary embodiments of the present technology;

FIG. 5A representatively illustrates a first plurality of cell openings in accordance with an exemplary embodiment of the present technology;

FIG. 5B representatively illustrates a second plurality of cell openings in accordance with an exemplary embodiment of the present technology;

FIG. 6A representatively illustrates a second cross-sectional view of the head covering in accordance with an exemplary embodiment of the present technology;

FIG. 6B representatively illustrates a plan view of the head covering in accordance with an exemplary embodiment of the present technology;

FIG. 7 representatively illustrates a cross-sectional view of a third cell in accordance with an exemplary embodiment of the present technology;

FIG. 8A representatively illustrates a grid of hexagon-shaped cells used in conjunction with the head covering in accordance with a first exemplary embodiment of the present technology;

FIG. 8B representatively illustrates a grid of triangle-shaped cells used in conjunction with the head covering in accordance with a second exemplary embodiment of the present technology;

FIG. 8C representatively illustrates a grid of circular-shaped cells used in conjunction with the head covering in accordance with a third exemplary embodiment of the present technology; and FIG. 9 is a flow chart illustrating a method for a head covering in accordance with an exemplary embodiment of the present technology.

Elements and steps in the figures are illustrated for simplicity and clarity and have not necessarily been rendered according to any particular sequence. For example, steps that may be performed concurrently or in different order are illustrated in the figures to help to improve understanding of embodiments of the present technology. In addition, elements in the figures may not be illustrated to scale.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, exemplary embodiments of the present technology may employ various materials, hat components, sun protection, and the like, for example various fabrics, plastics, brims, hatbands, sidewalls, crowns, and the like, which may carry out a variety of functions. In addition, various aspects of the present technology may be practiced in conjunction with any number of head coverings, for example a baseball cap, cowboy hat, safari hat, sombrero, hard hat, helmet, and the like, and the systems and methods described are merely exemplary applications for the technology. Further, exemplary embodiments of the present invention may employ any number of conventional techniques for sun protection, environmental protection, air circulation, sweat absorption, physical injury protection, coupling with a head (human or otherwise), size adjustment, manufacturing, injection molding, 3D printing, and the like.

Various representative implementations of the present technology may be applied to any suitable head covering system. Certain representative implementations may include, for example, a head covering sidewall configured with a plurality of openings configured to allow the circulation of air between the interior and exterior of the head covering while having a depth sufficient enough to prevent direct sunlight from passing through to the interior of the head covering. Methods and apparatus for improved air circulation may operate in conjunction with a head covering 100. Referring now to FIG. 1A, the head covering 100 may comprise a base 105, a sidewall 110, and a crown 140. In some embodiments, the head covering 100 may comprise a brim 115.

The base 105 defines a lower limit of the sidewall 110. The base 105 may be coupled to the sidewall 110 and may also be coupled to the brim 115. As used herein, the term "coupled" may also refer to two components being part of the same material, object, or otherwise integrated together. The base 105 may form a substantially planar closed curve surface configured to fit around an object such as a human head. The base 105 may comprise any suitable system for shaping the sidewall to fit the head. For example, the base 105 may comprise a material approximately circular or oval in shape, a material shaped approximately like the circumference of a human head, a hatband and/or sweatband (whether or not adjustable), and/or the like. In some embodiments, the base 105 may secure the head covering 100 on the wearer's head, for example an adjustable hatband. An adjustable portion of the hatband may comprise an adjustment device of any suitable type such as a buckle, ratchet, strap, hook-and-loop, or cinch system, and/or the like. In other embodiments, the base 105 may be configured to be separated from the wearer's head when worn, such as for some hard hats or helmets where a separate system may be used to secure the head covering 100 on the wearer's head (for example foam padding, an internal harness system, and the like). The separate system for securing the head covering 100 may be part of or coupled with any suitable portion of the head covering 100.

The brim 115 may provide protection for a wearer of the head covering 100 ("wearer" and "user" may be used interchangeably). The brim 115 may be coupled with or may be part of the base 105 and/or sidewall 110. The brim 115 may comprise any suitable system for reducing the amount of sunlight, rain, snow, debris, and/or the like that the wearer experiences. For example, the brim 115 may comprise a baseball hat-type brim, a visor, a safari hat-type brim, a cowboy hat-type brim, a hard hat-type brim, and/or the like. In some embodiments, the head covering 100 may not comprise a brim 115, for example certain types of beanies, hard hats, and helmets.

The sidewall 110 may be configured to cover part of the wearer's head. The sidewall 110 may be coupled to the base 105 and extend upward from the base 105 to the crown. In some embodiments, for example when the base 105 comprises an adjustable portion, the sidewall 110 may not be directly coupled to the base 105 in the area of the adjustable portion, but still generally extends upward from base 105 in the area of the adjustable portion. Referring to FIG. 1B, the sidewall 110 may comprise an exterior surface 130 and an interior surface 120 configured to face the wearer's head.

The sidewall 110 may comprise any suitable system for providing protection from the sun, heat, cold, rain, snow, other weather, debris, physical impact, physical injury, and/or the like. In an exemplary embodiment, the sidewall 110 may comprise a cellular structure configured to protect from the sun as well as provide air circulation. The cellular structure may comprise one or more panels of an injection molded or 3D printed material, such as one or more thermoplastics, thermosetting polymers, elastomers, metals, and/or the like. The cellular structure may comprise one or more panels of a soft and/or non-rigid material, such as foam, fabric, and/or the like. The cellular structure may comprise a plurality of cells directed generally horizontally perpendicular to an axis of the head covering 100. For example, referring now to FIG. 2, the axis 200 of the head covering 100 may comprise a vertical line passing through the head covering 100 that would be both positioned approximately in the center of the wearer's head and perpendicular to a horizontal plane 210 when worn by the wearer as intended and with the wearer's head upright. The axis 200 may be considered to run in the vertical direction, and terms such as up, down, upper, lower, top, bottom, and the like are in reference to the axis 200, with the crown 140 being above the base 105. The sidewall 110 may be configured for use in a conventional cap, as shown in FIG. 1A. In another embodiment, the sidewall 110 may be configured for use in a hard hat and may comprise a cellular structure to protect from the sun, physical impact, and/or injury, as well as provide air circulation.

The crown 140 closes off an upper portion of the interior surface 120 of the sidewall 110. For example, the crown 140 may be disposed above an upper edge of the sidewall 110 and form a closed top portion of the head covering 100. The crown 140 may comprise any suitable system for providing protection to the wearer's head from elements such as the sun, heat, cold, rain, snow, other weather, debris, physical impact, physical injury, and/or the like. The crown 140 may comprise a conventional crown or may comprise a cellular structure as described in connection with the sidewall 110.

Referring now to FIG. 3A, the sidewall 110 may comprise one or more cells 300. In an exemplary embodiment, at least some of the cells 300 are substantially horizontally-centered, with reference to the exterior surface 130, along a vertical plane. Some or all of the cells that are substantially centered along the vertical plane form a set of cells referred to as a substantially vertically-collinear cell set. For example, the sidewall 110 shown in FIG. 1B comprises a plurality of substantially vertically-collinear cell sets, one of which comprises the cells along a first curved line 3A-3A', the first curved line 3A-3A' running in a first vertical plane. Similarly, at least some of the cells 300 may be substantially vertically-centered, with reference to the exterior surface 130, along a horizontal plane. Some or all of the cells that are substantially centered along the horizontal plane form a set of cells referred to as a substantially horizontally-collinear cell set. For example, the sidewall 110 shown in FIG. 1B comprises a plurality of substantially horizontally-collinear cells sets, one of which comprises the cells along a second curved line 160 running in a first horizontal plane.

Referring to FIGS. 3A and 3B, a cell 300 may comprise an interior opening 320 in the interior sidewall surface 120 and an exterior opening 330 in the exterior sidewall surface 130, and may form an open passageway between the interior sidewall surface 120 and exterior sidewall surface 130. The cell 300 may be configured to prevent a light ray 370 having an angle a or greater relative to a lower surface of the passageway from passing unobstructed through the open passageway. In some embodiments, the cell 300 may be configured to prevent a light ray 370 have an angle a or greater relative to a lower track of the passageway 350 from passing unobstructed through the open passageway, wherein the lower track of the passageway 350 runs along the lower surface of the passageway and may be thought of as representing the general trajectory and/or direction of the cell 300. A light ray 370 may be considered to be obstructed when it cannot pass through the open passageway without encountering an interior surface of the open passageway. The cell 300 may have any suitable shape in any suitable orientation to achieve this purpose. An obstructed light ray 370 may nonetheless still pass through the open passageway, for example if it reflects off an interior surface of the cell and continues to travel toward the interior opening 320. In some embodiments, the cell 300 may be made from any suitable material, have any suitable coating, have any suitable shape on the interior of the cell 300 (e.g. sawtooth protrusions), and/or the like to reduce the energy of the light ray 370 and/or reduce the number of light rays 370 that encounter the interior surface of the cell and continue to travel toward the interior opening.

Referring now to FIG. 4A, the cell 300 may have its interior opening 320 and exterior opening 330 substantially tangent to the sidewall 110 in the horizontal direction, such that a first horizontal line 420 passing from one side of the interior opening 320 to another side of the interior opening 320 will be substantially parallel with a second horizontal line 430 passing from one side of the exterior opening 330 to another side of the exterior opening 330. Referring to FIGS. 4A-4C, the interior opening 320 and exterior opening 330 may be substantially parallel (FIG. 4B), may be tilted on the horizontal lines in the same direction but at different angles (FIG. 4C), or may be tilted on the horizontal lines toward or away from each other (FIG. 4D, e.g. referring to the tops of the interior opening 320 and exterior opening 330), as a few non-limiting examples. A cell 300 configured in such a way may be referred to as a regular cell. Referring to FIG. 3A, the interior openings 320 and exterior openings 330 are substantially parallel, albeit slightly curved, and these cells 300 are considered regular cells. In an exemplary embodiment, the interior opening 320 and exterior opening 330 may be substantially normal to the sidewall 110, for example as shown in FIG. 1A, though the open passageway of each cell 300 may not run in the direction normal to the sidewall 110. Though the systems and methods described herein may be with reference to a regular cell, one of ordinary skill in the art will recognize that the same techniques can be used to configure non-regular cells to perform the same functions.

To prevent a light ray at a predetermined angle from passing unobstructed through the cell 300, a minimum depth T of the cell 300 may be determined based on the predetermined angle and a height H of the cell 300 at the exterior opening 330. The height H and depth T may be measured with respect to a vertical plane intersecting the cell 300. The height H of the cell 300 may be defined to be the length of the longest straight line running from an upper edge of the exterior opening 330 to a lower point 360 in the cell 300, the line being perpendicular to the surface of the cell at the lower point 360 (in the direction running along the lower track of the passageway 350). This line may be referred to as the height line 355. The point where the height line 355 intersects the upper edge of the exterior opening 330 may be referred to as the upper point 340. The height line 355 runs in the vertical plane intersecting the cell 300, but is not necessarily completely vertical. For example, while the height line 355 shown in FIG. 3B may be completely vertical, the height line 660 of a cell 440 in FIG. 6A may not be completely vertical.

The depth T of the cell 300 may be defined to be the length of the lower track of the passageway 350. The lower track of the passageway 350 may be defined to be a line running from the exterior opening 330 to the interior opening 320 along the interior surface of the passageway, the line passing through the lower point 360 and running along the line having the shortest distance from the lower point 360 to the interior opening 320. For a regular cell, the lower track of the passageway 350 may generally run along a line approximately perpendicular to both the interior opening 320 and exterior opening 330, and will run in the same vertical plane intersecting the cell 300 that the height line 355 runs in. Therefore, for a regular cell, the height line 355 and lower track of the passageway 350 form a right-triangle in the vertical plane intersecting the cell 300.

It should be noted that the lower track of the passageway 350 does not necessarily run along the lowest portion of the cell 300, and the upper point 340 is not necessarily at the highest point on the exterior opening 330, depending on the rotation of the cell, shape of the cell, and/or the like. For example, referring to FIG. 5A, which illustrates the exterior openings 330 of a plurality of triangular cells 300, the lower tracks of the passageways 350 run along the lowest portion of the cells, through the lower points 360, and the upper points 340 are at the highest point in each exterior opening 330. Referring to FIG. 5B, which illustrates the exterior cell openings 330 of a plurality of rotated triangular cells 300, the lower tracks of the passageways 350 running through the lower points 360 do not all run along the lowest portion of each cell 300, and the upper points 340 are not all at the highest point in each exterior opening 330.

Referring again to FIGS. 3A and 3B, the minimum depth T of the cell 300 can be chosen to prevent any light ray 370 at or above angle a relative to the lower track of the passageway 350 from passing unobstructed through the cell. As described above, the depth T of the cell 300 is the length of the lower track of the passageway 350. In an exemplary embodiment, a cell 300 has the upper point 340 and lower point 360 both on the exterior opening 330 (e.g. there is no backward or forward tilt to the exterior opening 330). In this embodiment, the length of the lower track of the passageway 350 is measured from the lower point 360 to the interior opening 320, and may determined by the angle a and the height H. For example, in this embodiment, the minimum length T of the lower track of the passageway 350 may be calculated as:

$$T = \frac{H}{\tan(a)}$$

In another exemplary embodiment, and referring to FIG. 3B, a cell 300 may have the lower point 360 recessed in from (and not on) the exterior opening 330. In this embodiment, the length of the lower track of the passageway 350 may be measured by adding the length of the lower track of the passageway 350 from the lower point 360 to the exterior opening 330 to the length of the lower track of the passageway 350 from the lower point 360 to the interior opening 320. The length of the lower track of the passageway 350 from the lower point 360 to the exterior opening 330 may be determined by the height H and the angle b of the exterior opening 330 relative to the lower track of the passageway 350. For example, the length of the lower track of the passageway 350 from the lower point 360 to the exterior opening 330 may be calculated as:

$$T = \frac{H}{\tan(a)}$$

In this embodiment, the minimum length T of the lower track of the passageway 350 may be calculated as:

$$T = \frac{H}{\tan(a)} + \frac{H}{\tan(b)}$$
$$= H \times \left(\frac{\tan(a) + \tan(b)}{\tan(a) \times \tan(b)}\right)$$
$$= H \times (\arctan(a) + \arctan(b))$$

While the above methods have been described in connection with a cell 300 that has a lower point 360 on or recessed from the exterior opening 330, the same principles may be used to determine the minimum depth of a cell 300 having its upper point 340 overhanging the lower edge of the exterior opening 330.

Each cell 300 may be arranged in the sidewall 110 such that the lower track of the passageway 350 of each cell 300 is parallel to some line intersecting the axis 200 of the head covering at some angle. Some, none, or all of the cells 300 may be parallel to the same line intersecting the axis 200. In other words, the cells 300 may be oriented similarly or differently in the sidewall 110. In an exemplary embodiment, referring to FIG. 6A, the lower tracks of the passageways 650, 652, 654 of each substantially vertically-collinear cell 640, 642, 644 are substantially parallel to each other and to a first line 610 intersecting the axis 200 at a first angle c. For a sidewall 110 that is shaped according to a circular base 105, for example a spherical sidewall, the first line 610 may be vertically-aligned with each of the lower tracks of the passageways 650, 652, 654.

Referring to FIG. 6B, for a sidewall 110 that is shaped according to a non-circular base, such as in a head covering 100 with an elliptical base 105, the first line 610 may be non-vertically aligned with the lower track of the passageway 450. Further, the lower tracks of the passageways 650, 656 for each substantially horizontally-collinear cell 640, 646 may be parallel to separate lines projecting outward from a same point of the axis 200 at the first angle c. The above may also be true for a sidewall 110 that is shaped according to a circular base 105. For example, the lower track of the passageway 650 for a first cell 640 may be parallel with the first line 610, and the lower track of the passageway 656 for a second cell 646 may be parallel with a second line 612 also intersecting the axis 200 at the first angle c. In this embodiment, the lower tracks of the passageways 650, 652, 654, 656 of each cell 640, 642, 644, 646 are at substantially the same angle (90°−c) with respect to the horizontal plane 210. These relationships may hold true for all cells in the sidewall 110, such that each lower track of a passageway 350 is at substantially the same angle with respect to the horizontal plane 210. In an exemplary embodiment, the first angle c is 90°, such that each of the lower tracks of the passageways 650, 652, 654, 656 is in one of a plurality of horizontal planes.

In some embodiments, some or all of the lower tracks of the passageways 350 in the sidewall 110 may be at different angles with respect to the horizontal plane 210. For example, each cell in the sidewall 110 may be arranged such that no two cells have a lower track of the passageway 350 at the same angle with respect to the horizontal plane 210, one or more groups of cells may be arranged such that all cells within the group have a lower track of the passageway 350 at the same angle with respect to the horizontal plane 210, or the like.

Overall, the head covering 100 may be configured to prevent light rays at or above an angle A relative to the horizontal plane 210 from passing unobstructed through the sidewall 100. The angle A may represent the angle of the sun above the horizon at or above which the head covering 100 is configured to prevent light rays from the sun from passing unobstructed to the interior of the head covering, when the head covering 100 is worn as intended on an upright head. The angles a and c for each cell 300 may therefore be determined according to the angle A. For example, referring now to FIG. 7, if the head covering 100 is configured for an angle A of 45°, and a lower track of the passageway 350 of a cell 300 is at an angle of 10° below the horizontal plane 210 (c=80°) when the head covering 100 is worn as intended, then the cell 300 may be configured with an angle a less than or equal to (A+(90°−c)), or 55°. The value of the angle c, for example, may be chosen to increase or decrease the thickness of the sidewall 110. Decreasing the angle c (and increasing the angle of the lower track of the passageway 350 with respect to the horizontal plane 210) may allow the thickness and/or weight of the sidewall 110 to be reduced while keeping the same angle A.

In some embodiments, the lower track of the passageway 350 of each of a plurality of cells 300 of the head covering 100 is at about the same angle with respect to the horizontal plane 210, and the height H and depth T of each of the plurality of cells 300 are configured to prevent light rays at some angle greater than or equal to a predetermined minimum angle relative to the lower track of the passageway 350 from passing unobstructed through the cell 300. The predetermined minimum angle may be at least about 15°. For example, each of the plurality of cells 300 may have an angle a of at least about 15°, such as in the range between about 25° and about 45°. Some or all of the plurality of cells 300 may be configured for different angles a or for substantially the same angle a, subject to the minimum predetermined angle. The angle c may be about 90°, such that the lower track of the passageway 350 for each of the plurality of cells 300 is substantially in a horizontal plane.

In an embodiment, the height H of each of the plurality of cells 300 may be substantially the same, and the angle a for each of the plurality of cells 300 may be substantially the same. For example, the height H of each of the plurality of cells 300 may be about 5 mm, and the angle a may be about 30°. For a cell having an angle b of 70°, the minimum depth T may be given by:

$$T = 5 \text{ mm} \times (\arctan(30°) + \arctan(70°)) = 10.48 \text{ mm}$$

In another exemplary embodiment, the height H of each of the plurality of cells 300 may be about 3.5 mm, and the angle a may be about 40°. If the angles a and b are kept the same, reducing the height H of a cell 300 will reduce the minimum depth T, which may also reduce the thickness of the sidewall 110 and the weight of the sidewall 110.

In view of the possible contours of the sidewall 110, the angle b may not be the same for each of the plurality of cells 300 even if the height H and angle a remain constant. In an exemplary embodiment, the exterior surface 130 may be substantially convex relative to the base 105, such that as a cell 300 is positioned higher in the sidewall 110, its angle b decreases. For a sidewall 110 that is approximately the same thickness throughout (measured normal to the convex curve of the sidewall 110), the minimum depth T of a cell 300 may then increase as it is positioned higher in the sidewall 110. For example, referring again to FIG. 3A which illustrates a slightly convex portion of a sidewall 110, the depth T of the lowest cell 300 is less than the depth T of the middle cell 300, which is less than the depth T of the upper cell 300.

Referring now to FIGS. 8A-8C, the interior opening 320, exterior opening 330, and passageway of the cell 300 may have any suitable shape. In an exemplary embodiment, a plurality of cells 300 may be shaped as hexagons, and may arranged in a grid representing a honeycomb. The cells 300 may also be shaped as stretched hexagons, rectangles, squares, rhombs, triangles, circles, and/or the like. Any interior or exterior corner or edge of the cell 300 may be rounded (also referred to as filleted). Each of the cells 300 in the sidewall 110 may be spaced at any suitable distance from other cells 300 in the sidewall 110. For example, if the height H of each cell 300 is 5 mm, the cell wall shared by each cell 300 and a neighboring cell 300 may be about 1 mm thick. The spacing may also depend on the properties of the sidewall 110 material. If the sidewall 110 is to be used in a hard hat, helmet, or the like, the cell walls may be made thicker and/or the cells 300 may be made deeper to provide the desired impact resistance, physical injury protection, and/or the like.

A plurality of cells 300 may be arranged in any suitable manner in the sidewall 110. In an exemplary embodiment, the plurality of cells 300 may be arranged in substantially vertically-collinear cell sets 800 and substantially horizontally-collinear cell sets 810. In other embodiments, the plurality of cells 300 may be arranged randomly, or such that relatively few or no substantially vertically-collinear cells sets 800 or substantially horizontally-collinear cells sets 810 exist in the sidewall 110.

In some embodiments, the sidewall 110 may comprise one or more injection-molded and/or 3D printed portions. For example, for a baseball cap such as shown in FIG. 1A, each sidewall portion between consecutive seams running from the base 105 to the crown 140 may comprise an individual injection molded panel, the entire sidewall 110 may comprise a single injection molded piece, or the like. A draft angle may be introduced to the walls of one or more cells 300 of a molded part (e.g. injection molding) to facilitate removal of the part from a mold. The draft angle may be any suitable angle, for example about 1° to 1.5°, and the direction of the draft depends on the planned direction of demolding. In an exemplary embodiment, the sidewall 110 may comprise six panels of a honeycomb material, wherein each panel may be planar or contoured (e.g. convex curve). Further, in an exemplary embodiment, all or a majority of the exterior openings 330 face approximately normal to the surface of the sidewall 110 which may provide an increased amount of air circulation, because the head covering 100 may allow air from any direction to pass through the sidewall 110. In another exemplary embodiment, all or a majority of the exterior openings 330 face approximately the same direction, for example in a forward- and/or rear-facing direction of the head covering. This may be useful, for example, in a sport involving significant forward movement, because the forward-facing exterior openings 330 may maximize the amount of air able to pass through the sidewall 110 during forward motion.

Referring now to FIG. 9, a method of forming a head covering device with improved air circulation (900) may comprise forming a base 105 (910), forming a sidewall 110 (920), disposing the sidewall 110 above the base 105 (930), and disposing a crown 140 above the sidewall 110 (940). Forming the base 105 (910) may comprise forming one or more materials into a substantially planar closed curve configured to fit (whether snuggly or loosely) around a user's head. The base 105 may comprise an adjustable portion, and may be part of or coupled with the sidewall 110. The crown 140 may comprise any suitable system for providing protection to the wearer's head, and disposing the crown 140 above the sidewall 110 (940) may comprise disposing the sidewall above an upper edge of the sidewall 110. The crown 140 may be part of or coupled with the sidewall 110.

The sidewall 110 may be configured as previously described. The sidewall may be formed (920) using any suitable method. The sidewall 110 may be formed (920) as a plurality of panels which are coupled together in any suitable arrangement, or formed as a single piece. The sidewall 110 may be formed (920) by any suitable method, such as injection molding, 3D printing, room temperature vulcanization ("RTV") silicone mold casting, sewing, or the like. In some embodiments, such as for hard hats, helmets, or the like, the sidewall 110 may be formed (920) as a single piece with the crown 140 and/or base 105. In some embodiments, the method of forming the head covering (900) may further comprise forming a brim 115. The brim may be formed as part of the base 105 and/or sidewall 110, and/or coupled to the base 105 and/or sidewall 110.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing description, the invention has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A personal head covering device for blocking lights rays from reaching a user's head, comprising:
   a base forming a substantially planar closed curve configured to fit around a user's head;
   a single sidewall extending upward from the base along the entire substantially planar closed curve, wherein the sidewall comprises:
   an interior surface;
   an exterior surface; and
   a plurality of cells extending through the single sidewall from the interior and exterior surfaces, wherein:
      each cell from the plurality of cells comprises a height and a depth forming an open passageway between the interior and exterior surfaces, wherein:
         the height is the length of a line, perpendicular to a lower track of the passageway, extending from the lower track of the passageway to a top exterior edge of the passageway; and
         the depth is the length of the lower track of the passageway;
      the lower track of each passageway in the plurality of cells are oriented at substantially the same angle with respect to a horizontal plane when the personal head covering device is worn by the user;
      an upper surface of each passageway overlaps the lower track of the passageway; and
      the height and depth are configured to prevent light rays having an angle greater than or equal to about 15 degrees relative to the lower track of the passageway from passing unobstructed through the open passageway; and
   a crown disposed above an upper edge of the sidewall and configured to close off the interior surface of the sidewall.

2. The personal head covering device of claim 1, wherein for each cell from among the plurality of cells, the minimum depth T of the cell, to prevent a light ray having an angle greater than or equal to a degrees relative to the lower track from passing unobstructed through the open passageway, is given by:

$$T = H \times \left( \frac{\tan(a) + \tan(b)}{\tan(a) \times \tan(b)} \right)$$

where H is the height and b is the angle of the exterior opening relative to the lower track of the passageway.

3. The personal head covering device of claim 2, wherein the height of each cell from the plurality of cells is substantially the same.

4. The personal head covering device of claim 3, wherein:
   the exterior surface of the sidewall is substantially convex relative to the base; and
   the plurality of cells comprises at least one substantially vertically-collinear cell set, wherein the depth of a first cell from the substantially vertically-collinear cell set is greater than the depth of a second cell from the substantially vertically-collinear cell set that is positioned below the first cell.

5. The personal head covering device of claim 1, wherein each cell from the plurality of cells is in the shape of a hexagon.

6. The personal head covering device of claim 5, wherein the plurality cells forms a honeycomb grid.

7. A personal head covering device for blocking lights rays from reaching a user's head, comprising:
   a base forming a substantially planar closed curve configured to fit around a user's head;
   a single sidewall extending upward from the base along the entire substantially planar closed curve, wherein the sidewall comprises:
   an interior surface;
   an exterior surface; and
   a plurality of substantially vertically-collinear cell sets extending through the single sidewall from between the interior and exterior surfaces, wherein:
      each vertically-collinear cell set from the plurality of substantially vertically-collinear cell sets comprises a plurality of cells;
      each cell from the plurality of cells comprises a height and a depth forming an open passageway between the interior and exterior surfaces, wherein:
         the height is the length of a line, perpendicular to a lower track of the passageway, extending from the lower track of the passageway to a top exterior edge of the passageway; and
         the depth is the length of the lower track of the passageway;
      the lower track of each passageway in a substantially vertically-collinear cell set are substantially parallel to a first line projecting outward from an axis of the sidewall at a first angle to the axis;

the lower track of each passageway in a set of substantially horizontally-collinear cells are substantially parallel to separate lines projecting outward from a same point of the axis at the first angle to the axis;

an upper surface of each passageway overlaps the lower track of the passageway; and the height and depth are configured to prevent light rays having an angle greater than or equal to about 15 degrees relative to the lower track of the passageway from passing unobstructed through the open passageway; and a crown disposed above an upper edge of the sidewall and configured to close off the interior surface of the sidewall.

8. The personal head covering device of claim 7, wherein the first angle is 90 degrees.

9. The personal head covering device of claim 7, wherein for each cell from among the plurality of cells, the minimum depth T of each cell, to prevent a light ray having an angle greater than or equal to a degrees relative to the lower track of the passageway from passing unobstructed through the open passageway, is given by:

$$T = H \times \left( \frac{\tan(a) + \tan(b)}{\tan(a) \times \tan(b)} \right)$$

where H is the height and b is the angle of the exterior opening relative to the lower track of the passageway.

10. The personal head covering device of claim 9, wherein the angle a is in the range between 25 and 45 degrees.

11. The personal head covering device of claim 9, wherein:

the height of a first cell from the plurality of cells is substantially the same as the height of a second cell from the plurality of cells; and each cell from the plurality of cells comprises the same angle a.

12. The personal head covering device of claim 11, wherein the height is about 5 millimeters.

13. The personal head covering device of claim 11, wherein:

the exterior surface of the sidewall is substantially convex relative to the base;

in at least one of the substantially vertically-collinear cell sets, the depth of a first cell from the plurality of cells is greater than the depth of a second cell from the plurality of cells positioned below the first cell.

14. The personal head covering device of claim 7, wherein each cell from the plurality of cells is in the shape of a hexagon.

15. The personal head covering device of claim 7, wherein the plurality of substantially vertically-collinear cell sets forms a honeycomb grid.

16. The personal head covering device of claim 7, wherein each cell from the plurality of cells is in the shape of a rectangle.

* * * * *